(12) United States Patent
Yokoyama

(10) Patent No.: US 10,929,044 B2
(45) Date of Patent: Feb. 23, 2021

(54) INFORMATION PROCESSING APPARATUS

(71) Applicant: NEC Corporation, Tokyo (JP)

(72) Inventor: Jun Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/903,098

(22) Filed: Feb. 23, 2018

(65) Prior Publication Data

US 2018/0275910 A1   Sep. 27, 2018

(30) Foreign Application Priority Data

Mar. 23, 2017  (JP) .............................. JP2017-057264

(51) Int. Cl.
*G06F 12/00* (2006.01)
*G06F 3/06* (2006.01)
*H04L 29/08* (2006.01)
*G06F 11/14* (2006.01)

(52) U.S. Cl.
CPC ............ *G06F 3/0647* (2013.01); *G06F 3/065* (2013.01); *G06F 3/067* (2013.01); *G06F 11/14* (2013.01); *G06F 11/1461* (2013.01); *G06F 11/1464* (2013.01); *H04L 67/1097* (2013.01)

(58) Field of Classification Search
CPC ...... G06F 3/067; G06F 3/0647; G06F 3/0683; G06F 11/1458; G06F 3/065; G06F 11/1469; G06F 16/27; G06F 11/1451; G06F 11/2094; G06F 11/1448; G06F 11/203; G06F 16/122; G06F 16/29; G06F 16/9537; H04W 4/80
See application file for complete search history.

(56) References Cited

U.S. PATENT DOCUMENTS

| 6,415,296 B1 * | 7/2002 | Challener ............. G06F 3/0613 |
| 7,055,011 B2 * | 5/2006 | Iwamura ............. G06F 11/2069 |
| | | 709/217 |
| 7,120,013 B1 | 10/2006 | Hutchings, IV et al. |
| 7,643,835 B1 * | 1/2010 | Nosack ................... H04L 67/16 |
| | | 455/456.3 |
| 7,970,350 B2 * | 6/2011 | Sheynman ............ H04W 8/005 |
| | | 455/41.1 |
| 9,232,383 B1 * | 1/2016 | Burba ...................... H04W 4/80 |

(Continued)

FOREIGN PATENT DOCUMENTS

| JP | 2005-339572 A | 12/2005 |
| JP | 2006-522983 A | 10/2006 |

(Continued)

OTHER PUBLICATIONS

Japanese Office Action for JP Application No. 2017-057264 dated Mar. 13, 2018 with English Translation.

*Primary Examiner* — Prasith Thammavong

(57) ABSTRACT

An information processing apparatus 100 is configured to include a selection unit 110 configured to select a storage device to be moved from a first place associated with a first storage device to a second place associated with a second storage device connected with the first storage device over a network, based on travel information 120 including the origin and the destination of the storage device. The storage device is selected as a third storage device to be used for storing transport target data stored in the first storage device and transporting the data to the second storage device.

13 Claims, 12 Drawing Sheets

(56) References Cited

U.S. PATENT DOCUMENTS

| | | | |
|---|---|---|---|
| 9,282,445 B2* | 3/2016 | Moreno | H04W 36/00835 |
| 9,641,629 B2* | 5/2017 | Nicholson | H04L 67/16 |
| 9,697,083 B2* | 7/2017 | Anglin | G06F 11/1435 |
| 9,910,614 B2* | 3/2018 | Kaiser | G06F 3/0613 |
| 10,009,255 B2* | 6/2018 | Singhal | H04L 61/15 |
| 10,552,085 B1* | 2/2020 | Chen | G06F 3/0647 |
| 2002/0060994 A1* | 5/2002 | Kovacs | H04W 88/06 370/328 |
| 2003/0122708 A1* | 7/2003 | Percy | H04W 4/023 342/357.52 |
| 2003/0200275 A1* | 10/2003 | Hirabayashi | H04L 67/1097 709/214 |
| 2005/0216788 A1* | 9/2005 | Mani-Meitav | G06F 11/1456 714/6.32 |
| 2006/0143507 A1* | 6/2006 | Tanaka | G06F 11/1662 714/6.32 |
| 2006/0271601 A1* | 11/2006 | Fatula, Jr. | G06F 11/1464 |
| 2007/0027936 A1* | 2/2007 | Stakutis | G06F 11/1451 |
| 2007/0050526 A1 | 3/2007 | Abe et al. | |
| 2007/0156956 A1* | 7/2007 | Misra | G06F 11/1451 711/114 |
| 2008/0256315 A1* | 10/2008 | Awai | G06F 11/1448 711/162 |
| 2010/0049916 A1* | 2/2010 | Nakajima | G06F 3/0611 711/114 |
| 2010/0077160 A1* | 3/2010 | Liu | G06F 3/0482 711/162 |
| 2011/0159806 A1 | 6/2011 | Yamada et al. | |
| 2012/0084523 A1* | 4/2012 | Littlefield | G06F 11/1469 711/162 |
| 2012/0233431 A1* | 9/2012 | Izawa | H04L 49/355 711/165 |
| 2013/0155947 A1* | 6/2013 | Curlander | H04W 4/38 370/328 |
| 2013/0282662 A1* | 10/2013 | Kumarasamy | G06F 11/14 707/649 |
| 2014/0010172 A1* | 1/2014 | Wei | H04W 76/14 370/329 |
| 2014/0094122 A1* | 4/2014 | Etemad | H04W 76/14 455/41.2 |
| 2014/0095817 A1* | 4/2014 | Hsu | G06F 11/1438 711/162 |
| 2016/0036623 A1* | 2/2016 | Clarkson | H04L 41/0668 714/4.11 |
| 2016/0147608 A1* | 5/2016 | Anglin | G06F 11/1435 711/162 |
| 2016/0227465 A1* | 8/2016 | Corinella | H04W 84/18 |
| 2016/0337863 A1* | 11/2016 | Robinson | H04W 12/08 |
| 2017/0075907 A1* | 3/2017 | Goswami | G06F 16/119 |
| 2017/0149886 A1* | 5/2017 | Shetty | G06F 3/0619 |
| 2018/0018340 A1* | 1/2018 | Shitara | G06F 3/0604 |

FOREIGN PATENT DOCUMENTS

| | | |
|---|---|---|
| JP | 2007-065984 A | 3/2007 |
| JP | 2011-139186 A | 7/2011 |
| JP | 2015-509307 A | 3/2015 |

* cited by examiner

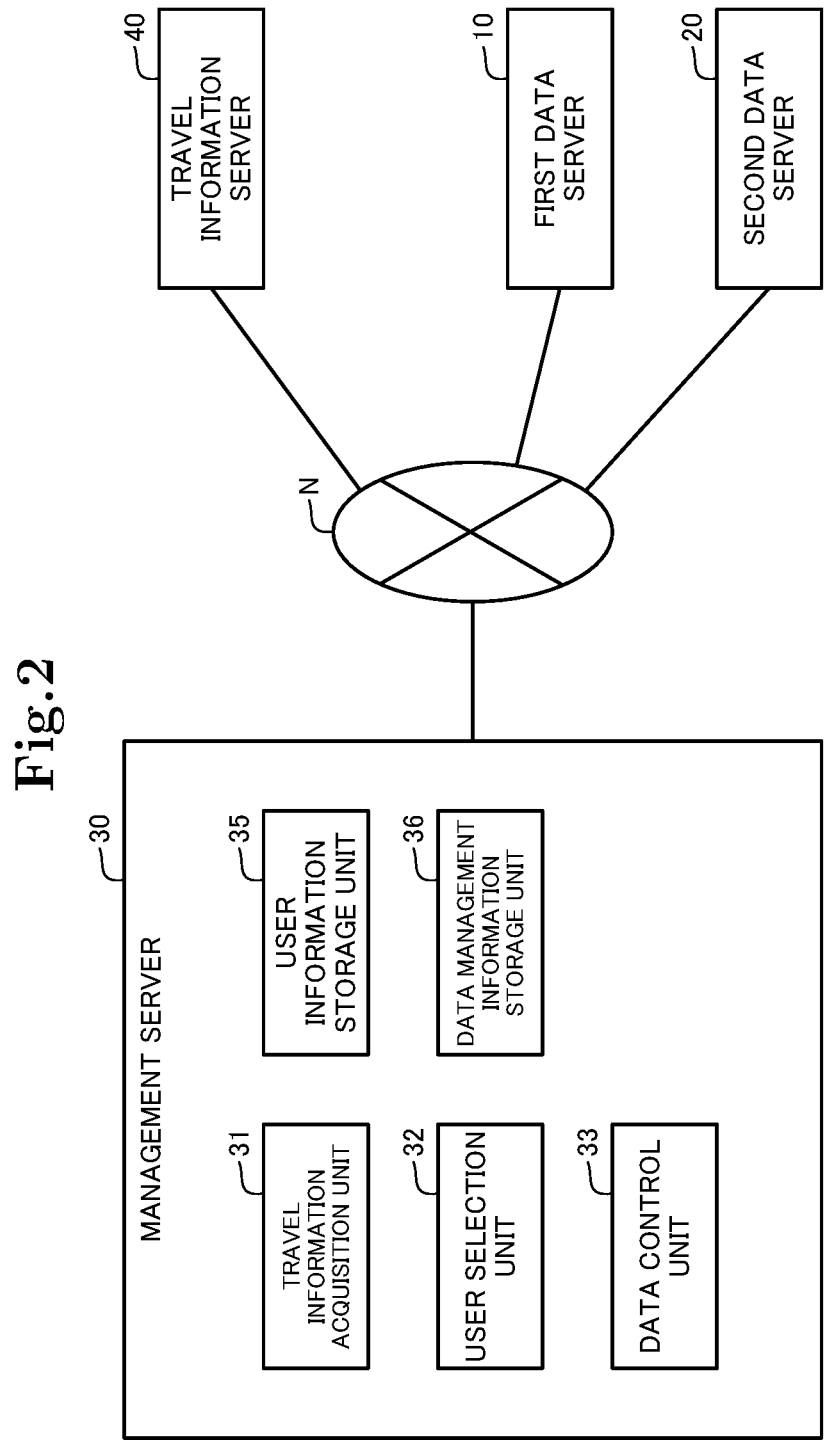

Fig.3

| USER ID | DEPARTURE DATE | PLACE OF DEPARTURE | ARRIVAL DATE | PLACE OF ARRIVAL | ... |
|---|---|---|---|---|---|
| D998877 | YYYY/MM/DD | JAPAN/NRT | YYYY/MM/DD | US/LAX | ... |
| D665544 | YYYY/MM/DD | JAPAN/NRT | YYYY/MM/DD | CHINA/PEK | ... |
| ... | ... | ... | ... | ... | ... |
| ... | ... | ... | ... | ... | ... |

Fig.4

| BACKUP TARGET DATA | BACKUP SOURCE | BACKUP DESTINATION | CAPACITY | SIGNIFICANCE | ... | BACKUP METHOD | USER ID |
|---|---|---|---|---|---|---|---|
| D998877 | AA/AA/XXXXXX | BB/AA/XXXXXX | 10GB | LOW | ... | NORMAL | U112233 |
| D665544 | AA/AA/XXXXXX | BB/AA/XXXXXX | 20GB | HIGH | ... | DISTRIBUTED/ DUPLICATE | U445566 U778899 |
| D332211 | AA/AA/XXXXXX | BB/AA/XXXXXX | 15GB | MEDIUM | ... | | |
| ... | ... | ... | ... | ... | ... | | |

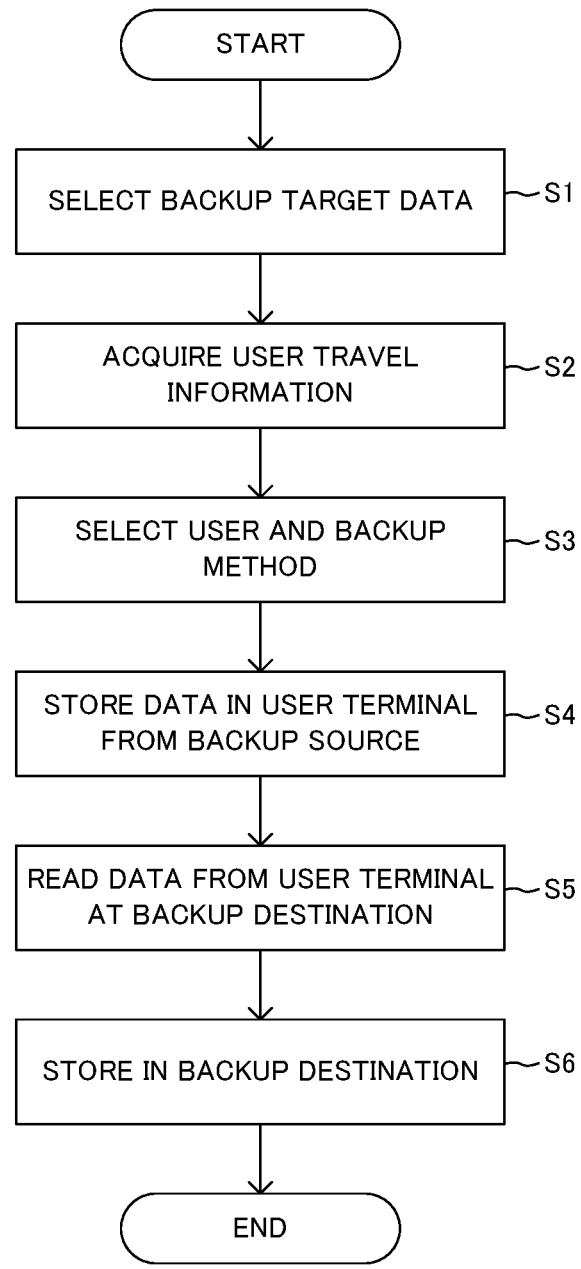

INFORMATION PROCESSING APPARATUS

INCORPORATION BY REFERENCE

The present invention is based upon and claims the benefit of priority from Japanese patent application No. 2017-057264, filed on Mar. 23, 2017, the disclosure of which is incorporated herein in its entirety by reference.

TECHNICAL FIELD

The present invention relates to an information processing apparatus, and in particular, to an information processing apparatus that assists data transmission.

BACKGROUND ART

With the development of network communication technology and communication networks, data can be transmitted instantly even in a far distance. For example, even in the case of transmitting data to a server in another country across the sea, data transmission can be made by using a submarine optical cable.

In the case of performing data transmission, a communication band is absolutely required. Accordingly, due to an increase and concentration of the amount of data transmission, an enormous load is placed on the network, which causes a problem of band shortage and a delay in data transmission. In order to solve the problem of band shortage, it is necessary to additionally install network communication facilities such as a submarine optical cable. This causes a problem that a facility cost is required, and the data transmission cost is also increased.

Meanwhile, under an environment where a communication network is not installed, a storage medium on which data is stored is transported, as described in Patent Literature 1. Specifically, in the technology of Patent Literature 1, data transport is realized by storing data on a carrier terminal mounted on a dump truck.

Further, in Patent Literature 2, a disk pack (hardware device) for a large-capacity storage is physically transported to a receiving side. Furthermore, Patent Literature 3 describes that a removable memory card is mounted on an on-vehicle computer to thereby acquire driving information.
[Patent Literature 1] JP 2011-139186 A
[Patent Literature 2] JP 2006-522983 A
[Patent Literature 3] JP 2005-339572 A However, Patent Literature 1 is intended to perform data transport in an environment where a communication network is not installed. Accordingly, suppressing a load on a network is not considered at all. Therefore, a problem that a network load cannot be reduced still remains.

In addition, as a carrier terminal is mounted on a dump truck in Patent Literature 1, a higher cost is required for communication facilities. This also causes a problem of an increase in the data transmission cost.

Similarly, even in Patent Literatures 2 and 3, as a physical medium is conveyed for data transport or a physical medium is mounted on a vehicle, a higher cost is required for the communication facilities. This also causes a problem of an increase in the data transmission cost.

SUMMARY

In view of the above, an exemplary object of the present invention is to solve the aforementioned problems, that is, problems that a load on a network cannot be reduced and that data transmission cost is increased.

An information processing apparatus, according to an exemplary aspect of the present invention, includes a selection unit configured to select a storage device to be moved from a first place associated with a first storage device to a second place associated with a second storage device connected with the first storage device over a network, based on travel information including an origin and a destination of the storage device. The storage device is selected as a third storage device to be used for storing transport target data stored in the first storage device and transporting the data to the second storage device.

An information processing system, according to an exemplary aspect of the present invention, includes an information processing apparatus, a first processing device, and a second processing device.

The information processing apparatus includes a selection unit configured to select a storage device to be moved from a first place associated with a first storage device to a second place associated with a second storage device connected with the first storage device over a network, based on travel information including an origin and a destination of the storage device. The storage device is selected as a third storage device to be used for storing transport target data stored in the first storage device and transporting the data to the second storage device.

The first processing device is connected with the first storage device over a network, and is installed in the first place. The first processing device is configured to connect with the third storage device at the first place and store the transport target data in the third storage device from the first storage device.

The second processing device is connected with the second storage device over a network, and is installed in the second place. The second processing device is configured to connect with the third storage device at the second place, acquire the transport target data from the third storage device, and store the transport target data in the second storage device.

A storage device, according to an exemplary aspect of the present invention, is configured to be selected based on travel information including an origin and a destination of the storage device, and moved from a first place associated with a first storage device to a second place associated with a second storage device connected with the first storage device over a network. The storage device is configured to store transport target data stored in the first storage device at the first place, and store the stored transport target data in the second storage device at the second place.

An information processing method, according to an exemplary aspect of the present invention, includes
selecting a storage device to be moved from a first place associated with a first storage device to a second place associated with a second storage device connected with the first storage device over a network, based on travel information including an origin and a destination of the storage device. The storage device is selected as a third storage device to be used for storing transport target data stored in the first storage device and transporting the transport target data to the second storage device.

A program, according to an exemplary aspect of the present invention, causes an information processing apparatus to realize
a selection unit configured to select a storage device to be moved from a first place associated with a first storage device to a second place associated with a second storage device connected with the first storage device over a network, based on travel information including an origin and a destination of the storage device. The storage device is selected as a third storage device to be used for storing transport target data stored in the first storage device and transporting the data to the second storage device.

As the present invention is configured as described above, it is possible to reduce a load placed on a network and to reduce the data transmission cost.

BRIEF DESCRIPTION OF THE DRAWINGS

FIG. 2 is a block diagram illustrating a configuration of a management server disclosed in FIG. 1;

FIG. 3 illustrates exemplary data stored in a data management information storage unit disclosed in FIG. 2;

FIG. 4 illustrates exemplary data stored in a user information storage unit disclosed in FIG. 2;

FIG. 5 is a flowchart illustrating an operation of the information processing system disclosed in FIG. 1;

EXEMPLARY EMBODIMENTS

First Exemplary Embodiment

Figure 1:
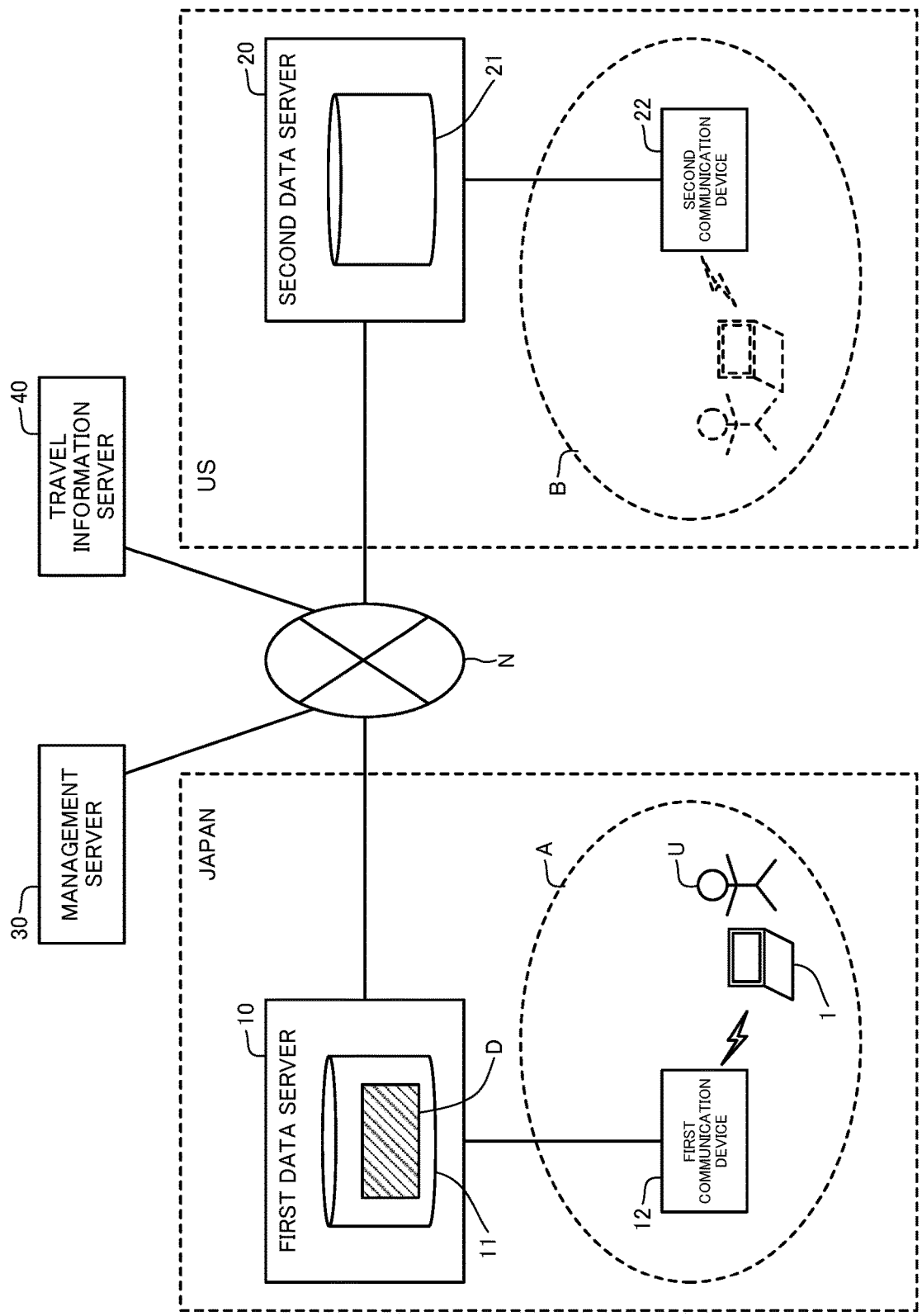
FIG. 1 is a block diagram illustrating an overall configuration of an information processing system according to a first exemplary embodiment of the present invention.

A first exemplary embodiment of the present invention will be described with reference to FIGS. 1 to 12. FIGS. 1 to 4 are diagrams for explaining a configuration of an information processing system according to the first exemplary embodiment. FIGS. 5 to 12 are diagrams for explaining operation of the information processing system.

The information processing system of the present invention is used for data transmission. Description will be given below for the case where the information processing system is used when data of a business server is backed up in a data server of another data center, for example. However, the information processing system of the present invention is applicable to any data transmission without being limited to data transmission for data backup.

[Configuration]

The information processing system of the present embodiment includes a first data server 10 having a first storage device 11 in which backup target data D is stored, and a second data server 20 having a second storage device 21 in which the data D is to be backed up. The first data server 10 and the second data server 20 are installed in different places. For example, it is assumed that the first data server 10 is installed in Japan (first place) and the second data server 20 is installed in the United States (second place).

Here, the first data server 10 and the second data server 20 are connected over a network N. For example, the network N is a submarine optical cable connecting Japan and the United States. Accordingly, on the network N between the first data server 10 and the second data server 20, an enormous load may be placed due to an increase or concentration of the data transmission amount. Thereby, a problem such as a delay in data transmission may be caused due to a band shortage. Further, in the case of using a high-speed communication channel such as a submarine optical cable, there is also a problem of an increase in the data transmission cost. Meanwhile, for some data, data transmission may not be urgent. Moreover, there is also a case where the owner of the data desires to reduce the data transmission cost.

In light of such a situation, the present invention has a configuration for transporting data without using the whole or part of the network N. For example, the present embodiment has a configuration for transporting data in such a manner that the data D (transport target data) is stored in a storage device (third storage device) of an information processing terminal 1 that is moved along with a user U who moves from Japan where the first data server 10 is installed to the United States where the second data server 20 is installed, by an airplane. It should be noted that in the present invention, the information processing terminal 1 for transporting data is not limited to be moved by an airplane. It may be moved by a ship, a truck, a bus, or the like. Further, the information processing terminal 1 for transporting data is not limited to be moved by being carried by the user U. It may be loaded on a mobile body such as an airplane.

In order to transport data as described above, the information processing system of the present embodiment includes a management server 30 connected with the first data server 10 and the second data server 20 over the network N. The management server 30 is configured of one or more information processing apparatuses having an arithmetic device and a storage device. As illustrated in FIG. 2, the management server 30 includes a travel information acquisition unit 31 (travel information acquisition unit), a user selection unit 32 (selection unit), and a data control unit 33 (control unit) that are constructed by execution of a program by the arithmetic device. The management server 30 also includes a user information storage unit 35 and a data management information storage unit 36 that are formed in the storage device. The configurations of these units will be described below.

The information processing system also includes a travel information server 40 that manages travel information of the user U who moves from Japan to the United States by an airplane while carrying the information processing terminal 1. The travel information server 40 is connected with the management server 30 over the network N. In the travel information server 40, reservation information of a flight that the user U is going to take is stored as travel information of the user U. The travel information server 40 is configured to provide the travel information to the management server 30 according to an access from the management server 30 in advance.

The information processing system also has a first communication device 12 (first processing device) connected with the first data server 10 over a network, in an airport A in Japan where the first data server 10 is installed. The first communication device 12 is capable of performing data communication with the first data server 10 over a network, has a wireless communication function, and is capable of performing data communication by being connected with the information processing terminal 1 of the user U located in the wireless communication range. It should be noted that the first communication device 12 is not necessarily limited to be connected with the information processing terminal 1 of the user U in a wireless manner. The first communication device 12 may be connected in a wired manner, or the information processing terminal 1 may be directly connected with a connection terminal provided to the first communication device 12.

The information processing system also has a second communication device 22 (second processing device) connected with the second data server 20 over a network, in an airport B in the United States where the second data server 20 is installed, similarly. The second communication device 22 is capable of performing data communication with the second data server 20 over a network, has a wireless communication function, and is capable of performing data communication by being connected with the information processing terminal 1 of the user U located in the wireless communication range. It should be noted that the second communication device 22 is not necessarily limited to be connected with the information processing terminal 1 of the user U in a wireless manner. The second communication device 22 may be connected in a wired manner, or the information processing terminal 1 may be directly connected with a connection terminal provided to the second communication device 22.

Next, the configuration of the management server 30 will be described in detail. The travel information acquisition unit 31 of the management server 30 accesses the travel information server 40 to acquire travel information of the user U, and stores it in the user information storage unit 35. In the present embodiment, user information of the user U who registered in a data transport service is stored in the user information storage unit 35 in advance, for example, and the reservation information of the flight of such a user is acquired from the travel information server 40 as travel information. FIG. 3 illustrates exemplary travel information acquired. The travel information includes a user ID for identifying the user, a place of departure (origin) and the departure date, and a place of arrival (destination) and the arrival date. The place of departure and the place of arrival include information specifying the countries and airports.

It should be noted that the travel information is not limited to the information described above. The travel information may be travel information of a transportation that the user U carrying the information processing terminal 1 takes, or travel information of a moving body on which the information processing terminal 1 is loaded. This means that it is only necessary that the travel information includes the origin and the destination of the information processing terminal 1.

Next, the user selection unit 32 of the management server 30 will be described. The user selection unit 32 selects the user U who transports the data D to be transported. This means that the user selection unit 32 selects the user U who carries the information processing terminal 1 provided with the storage device in which the data D is stored and transported.

Specifically, the user selection unit 32 first reads data transmission information including a backup source (transmission source) representing the storage location of the data D to be transported for backup, and a backup destination (transport destination) representing a location where it is stored as a backup copy. This is previously stored in the data management information storage unit 36 of the management server 30. FIG. 4 illustrates exemplary data transmission information including identification information of backup target data, a backup source, a backup destination, capacity, and significance of data. At this time, the backup source and the backup destination each include location information such as a country or a region where the server serving as a backup source or a backup destination is located. The significance is a value set in consideration of the degree of secrecy of the data D to be backed up, days taken until backup is completed, and the like. A backup method and a user ID are blank before backup, and are set later.

Then, the user selection unit 32 selects a user U who carries the information processing terminal 1 used for transporting the data D, based on the data transmission information described above and the acquired travel information. For example, the user selection unit 32 acquires the backup source and the backup destination of the data D to be backed up from the data transmission information, and selects a user U whose place of departure and place of arrival are set to the respective locations. Accordingly, in the present embodiment, a user U who takes an airplane from Japan to the United States is selected. At this time, the user selection unit 32 selects the user U in consideration of the priority of the data D to be backed up. For example, as backup is required for the data D of high priority, the user selection unit 3 selects the user U whose departure date is close.

The user selection unit 32 also selects a backup method, that is, a method of transporting the data, according to the priority of the data D to be backed up. For example, regarding the data D of high priority, high security performance and reliability are required at the time of transporting the data. Accordingly, a data transport method such as duplicate transport or distributed transport is selected. A specific transport method will be described below.

Next, the data control unit 33 of the management server 30 will be described. The data control unit 33 controls input and output of the data D to and from the information processing terminal 1 such that the data to be backed up is stored in the information processing terminal 1 of the user U and the data is read out in the United States that is the destination, as described above. For example, the data control unit 33 instructs the first data server 10 to store the data D, stored in the first data server 10, in the information processing terminal 1 of the user U via the first communication device 12 installed in the airport A in Japan that is the place of departure of the selected user U. Thereby, the first data server 10 accesses the information processing terminal 1 of the user U located at the airport A in Japan via the first communication device 12, and stores the data D to be backed up in the storage device of the information processing terminal 1.

Further, the data control unit 33 instructs the second data server 20 to acquire the data D, stored in information processing terminal 1 of the user U, via the second communication device 22 installed in the airport B in the United States that is the place of arrival of the selected user U, and store it in the second data server 20. Thereby, the second data server 20 accesses the information processing terminal 1 of the user U located at the airport B in the United States via the second communication device 22, and acquires the data D to be backed up stored in the storage device of the information processing terminal 1, and stores it.

A connection between the first communication device 12 or the second communication device 22 and the information processing terminal 1 of the user U is realized when the information processing terminal 1 logs in the first communication device 12 or the second communication device 22 with use of identification information of the user U, via wireless communication in the airport A or B, for example. A connection between the first communication device 12 or the second communication device 22 and the information processing terminal 1 of the user U and transfer of the data D will be described in detail in the description of operation provided below.

[Operation]

Next, operation of transporting the data D to be backed up by the information processing system having the aforementioned configuration will be described with reference to the flowchart of FIG. 5 and FIGS. 6 to 8.

First, the management server 30 checks data management information as illustrated in FIG. 4, and selects the data D to be backed up (step S1). For example, the management server 30 checks the significance included in the data management information, and selects the data D of high significance preferentially, or selects the data based on a set backup time limit not illustrated.

Figure 6:
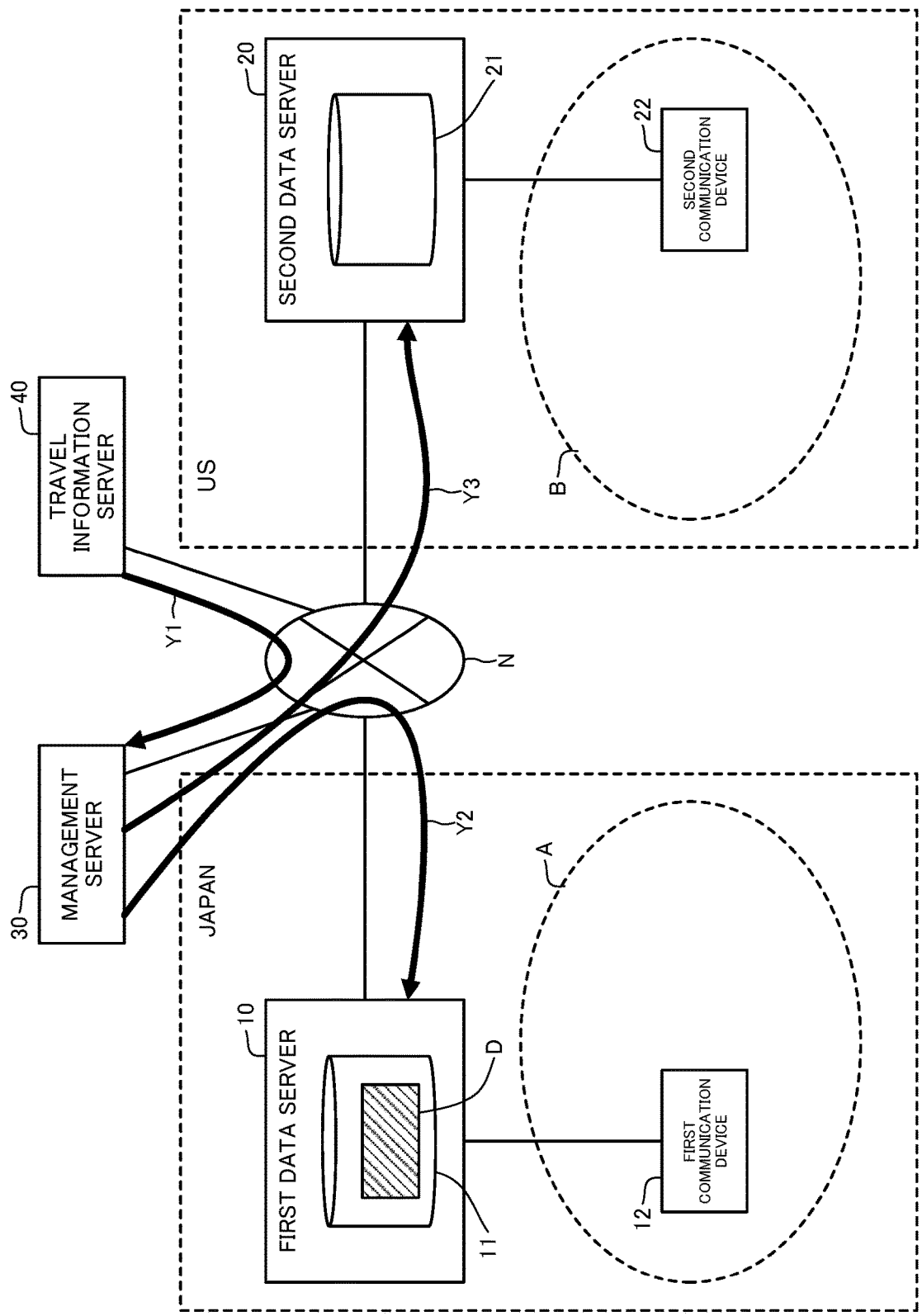
FIG. 6 illustrates a state of data transmission in the information processing system disclosed in FIG. 1.

Then, the management server 30 acquires user travel information from the travel information server 40 in order to select to the information processing terminal 1 of the user U who transports the selected data D to be backed up (step S2, an arrow Y1 of FIG. 6). In the present embodiment, the management server 30 acquires flight reservation information of the user U who is registered in a data transport service in advance, from a server of an airline company. The acquired travel information, that is, flight reservation information, includes a user ID for identifying the user, place of departure (origin) and the departure date, and place of arrival (destination) and the arrival date, as illustrated in FIG. 3, for example.

Then, the management server 30 uses the acquired user travel information to select the user U (step S3). At this time, the management server 30 selects the user U whose place of departure and place of arrival included in the user travel information respectively correspond to the backup source and the backup destination included in the data transmission information of the data D to be backed up, selected as described above. In the present embodiment, the first data server 10 that is the backup source of the data D to be backed up is located in Japan and the second data server 20 that is the backup destination is located in the United States. Therefore, the user U who moves from Japan to the United States is selected.

In the case where the backup time limit is set to the data D, or the data has high priority and immediate backup is required, the management server 30 selects the user U whose departure date is close. The management server 30 also selects a backup method according to the priority of the data D and the locations of the backup source and the backup destination (step S3). As backup methods, there are a "normal" method of transporting the data D by one information processing terminal 1 of the user U, a method such as "duplicate transport" or "distributed transport" for enhancing the security or reliability, and a "relay" method in which the data is relayed by the information processing terminals 1 of a plurality of users U. A "normal" method will be described below. The user U and the backup method selected in this manner are stored in the data management information as illustrated in FIG. 4.

Next, the management server 30 controls input and output of the data D to and from the information processing terminal 1 such that the data to be backed up is stored in the information processing terminal 1 of the user U in Japan and the data is read out in the United States that is the destination. Specifically, the management server 30 instructs the first data server 10 to store the data D, stored in the first data server 10, in the information processing terminal 1 of the user U via the first communication device 12 installed in the airport A in Japan that is the place of departure of the selected user U (an arrow Y2 of FIG. 6). Similarly, the management server 30 instructs the second data server 20 to acquire the data D, stored in the information processing terminal 1 of the user U, via the second communication device 22 installed in the airport B in the United States that is the place of arrival of the selected user U, and store it in the second data server 20 (an arrow Y3 of FIG. 6).

Then, upon accepting the instruction described above, the first data server 10 allows the first communication device 12 installed in the airport A in Japan from which the user U is going to depart, to connect with the information processing terminal 1 of the user U selected as the user who transports the data. For example, the first communication device 12 detects the information processing terminal 1 that appears in the airport A and logs in the data transport service via wireless communication in the airport A to thereby connect with the information processing terminal 1 of the selected user U. It should be noted that the first communication device 12 may connect with the information processing terminal 1 of the user U by any method. For example, in the case where unique identification information of the information processing terminal 1 of the user U is registered in advance, when an access is made from the information processing terminal 1 to the wireless communication of the airport, the first communication device 12 may detect the information processing terminal 1 and connect with it. Meanwhile, when the first communication device 12 is installed at a particular location in the airport A, and the user inputs the identification information of himself/herself and connects the information processing terminal 1 with the first communication device 12 by physical or near-field wireless communication, a connection may be established.

Figure 7:
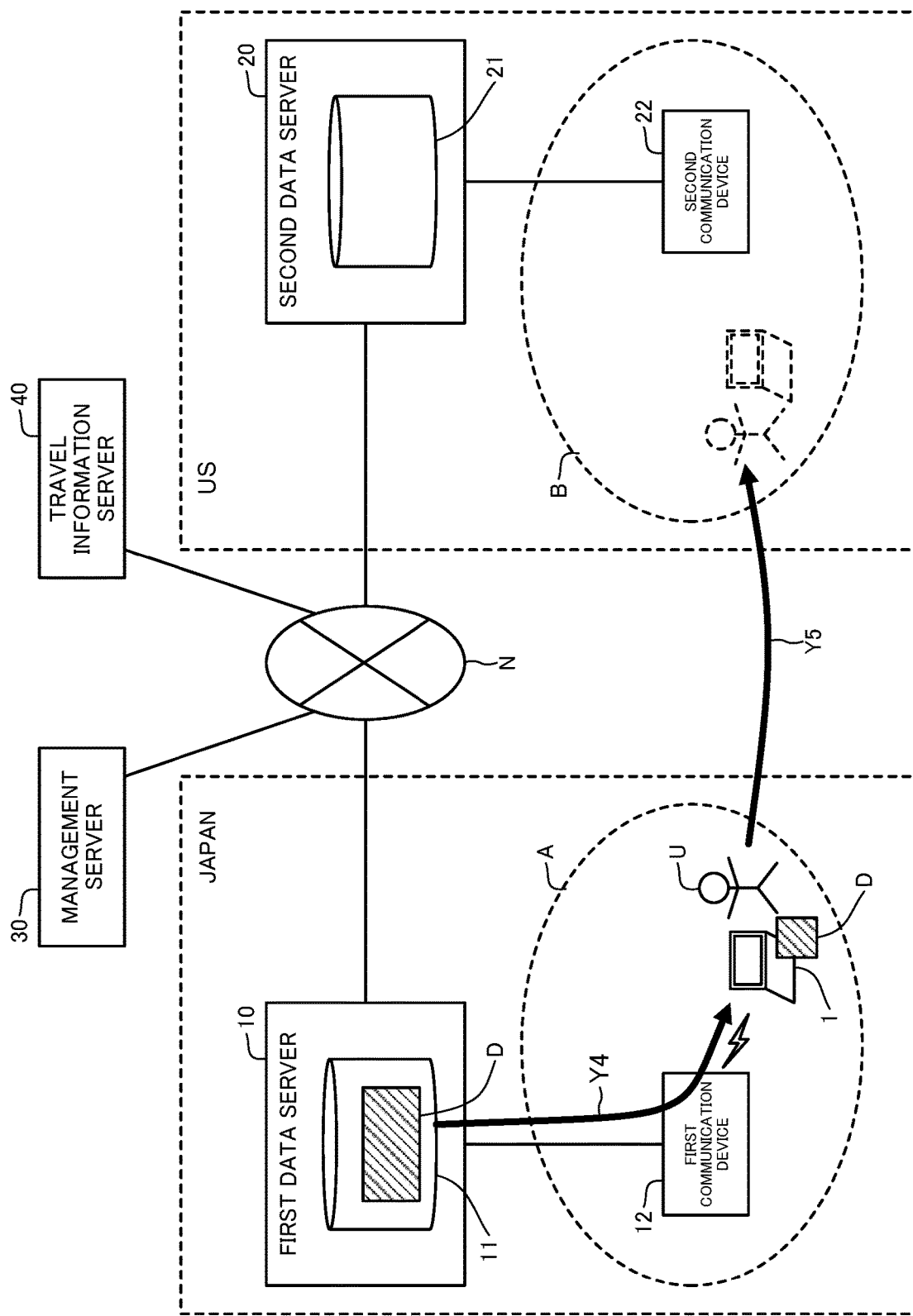
FIG. 7 illustrates a state of data transmission in the information processing system disclosed in FIG. 1.

Then, when the first data server 10 detects that the first communication device 12 and the information processing terminal 1 of the user U are connected with each other in the airport A, the first data server 10 transmits the data D to be backed up to the information processing terminal 1 via the first communication device 12 and stores it therein (step S4, an arrow Y4 of FIG. 7). Thereby, the data D is stored in the storage device in the information processing terminal 1 carried by the user U.

Then, the user U takes the flight while carrying the information processing terminal 1 in which the data D is stored, whereby the user U moves to the airport B in the United States that is the place of arrival (an arrow Y5 of FIG. 7). This means that the data D stored in the information processing terminal 1 is transported to the airport B in the United States.

Then, the second data server 20 installed in the United States allows the second communication device 22 installed in the airport B in the United States where the user U is going to arrive to connect with the information processing terminal 1 of the user U, in accordance with an instruction from the management server 30. For example, the second communication device 22 detects the user U who appears in the airport B and logs in the data transport service via wireless communication in the airport B to thereby connect with the information processing terminal 1 of the selected user U. It should be noted that the second communication device 22 may connect with the information processing terminal 1 of the user U by any method.

Then, when the second data server 20 detects that the second communication device 22 and the information processing terminal 1 of the user U are connected with each other in the airport B, the second data server 20 first reads the data D to be backed up stored in the information processing terminal 1, by the second communication device 22 (step S5). Then, the second data server 20 acquires the data D read via the second communication device 22, and stores it (step S6, an arrow Y6 of FIG. 8). Thereby, the data D is stored in the second data server 20 from the storage device in the information processing terminal 1 carried by the user U.

Through these processes, according to the information processing system of the present embodiment, the data D stored in the first data server 10 is able to be stored in the second data server 20 without using the network N. Accordingly, in the case where the data D is data to be backed up, it is possible to move the data to the destination without placing a load on the network or taking the network cost.

While the case of transporting the data D from Japan to the United States has been described above as an example, the present embodiment may be used in the case of transporting the data to any place. Further, while the case of transporting the data D by storing it in the information processing terminal 1 of the user U who moves by an airplane has been described above as an example, the data may be transported by the information processing terminal 1 of the user U who moves by a transportation such as a ship, a truck, or a bus. In that case, an operation schedule of a ship, a truck, or a bus that the user U will take is used as user travel information, for example. Further, the information processing terminal 1 for transporting the data is not limited to be moved by being carried by the user U. It may be an information processing terminal that is loaded on a mobile body such as an airplane, a ship, a truck, or a bus.

[Variation 1]

Next, another method of transporting the data D to be backed up will be described with reference to FIG. 9. In the present variation, description will be given on the case where the data D is transported in duplicate using information processing terminals of a plurality of users.

When the management server 30 selects a method of transporting the data D in duplicate according to the significance or the previous setting of the selected data D, the management server 30 selects a plurality of users Ua and Ub. This means that the management server 30 selects the users Ua and Ub whose place of departure and place of arrival match the backup source and the backup destination of the selected data D, respectively. Here, the case where two users Ua and Ub are selected is described as an example.

Figure 9:
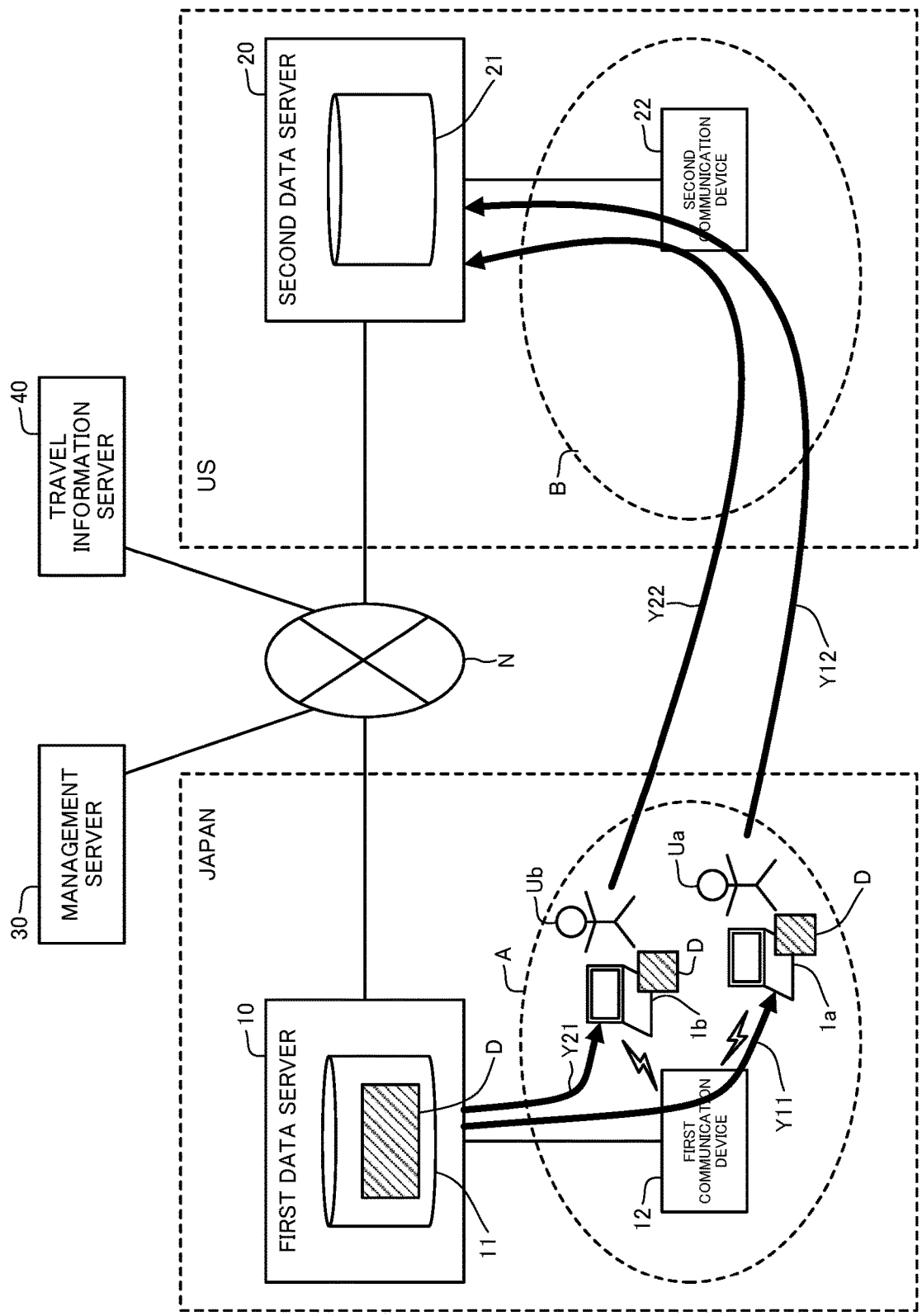
FIG. 9 illustrates a state of data transmission in the information processing system disclosed in FIG. 1.

The management server 30 controls to copy the data D to be backed up, and store in duplicate in respective information processing terminals 1a and 1b of the selected two users Ua and Ub in Japan (arrows Y11 and Y21 of FIG. 9). This means that the management server 30 detects the information processing terminals 1a and 1b of the two users Ua and Ub who come to the airport A in Japan, and stores the data D in the respective information processing terminals 1a and 1b via the first communication device 12. The process of storing the data D in the respective information processing terminals 1a and 1b is as described above.

Then, the users Ua and Ub take the flight while carrying the information processing terminals 1a and 1b in which the data D is stored respectively, whereby the users move to the airport B in the United States that is the place of arrival (arrows Y12 and Y22 of FIG. 9). This means that the data D stored in the information processing terminal 1 is transported to the airport B in the United States in duplicate.

Then, the second data server 20 installed in the United States acquire the data D from the respective information processing terminals 1a and 1b of the users Ua and Ub via the second communication device 22 installed in the airport B in the United States where the users Ua and Ub are going to arrive, and stores it (arrows Y12 and Y22 of FIG. 9). Thereby, the data D is stored in the second data server 20 from the storage devices in the information processing terminals 1a and 1b carried by the users Ua and Ub. The process of reading the data D from the respective information processing terminals 1a and 1b is as described above.

Through these processes, according to the information processing system of the present embodiment, the data D stored in the first data server 10 is able to be stored in the second data server 20 without using the network N. Accordingly, in the case where the data D is data to be backed up, it is possible to move the data to the destination without placing a load on the network or taking the network cost.

Further, in the present variation, as the data D is transported by the two users Ua and Ub, if one of the users Ua and Ub cancels the schedule and does not take the flight or if a failure occurs in one of the information processing terminals 1a and 1b, the data D is transported by the other one. Accordingly, reliability of data transport is enhanced. While the case of selecting the two users Ua and Ub has been described as an example, reliability of data transport is enhanced if a larger number of users are selected. It is also possible to store and transport only part of the data D in duplicate in information processing terminals of a plurality of users.

Even in the aforementioned case, it is not limited that the information processing terminals 1a and 1b are transported by an airplane. They may be transported by another mobile body. Further, it is not limited that the information processing terminals 1a and 1b are transported by being carried by the users Ua and Ub. They may be loaded on a mobile body.

[Variation 2]

Next, another method of transporting the data D to be backed up will be described with reference to FIG. 10. In the present variation, description will be given on the case where the data D is transported in a distributed manner by using information processing terminals of a plurality of users.

When the management server 30 selects a method of transporting the data D in a distributed manner according to the significance or the previous setting of the selected data D, the management server 30 selects a plurality of users Ua and Ub. This means that the management server 30 selects the users Ua and Ub whose place of departure and place of arrival match the backup source and the backup destination of the selected data D, respectively. Here, the case where two users Ua and Ub are selected is described as an example.

Figure 10:
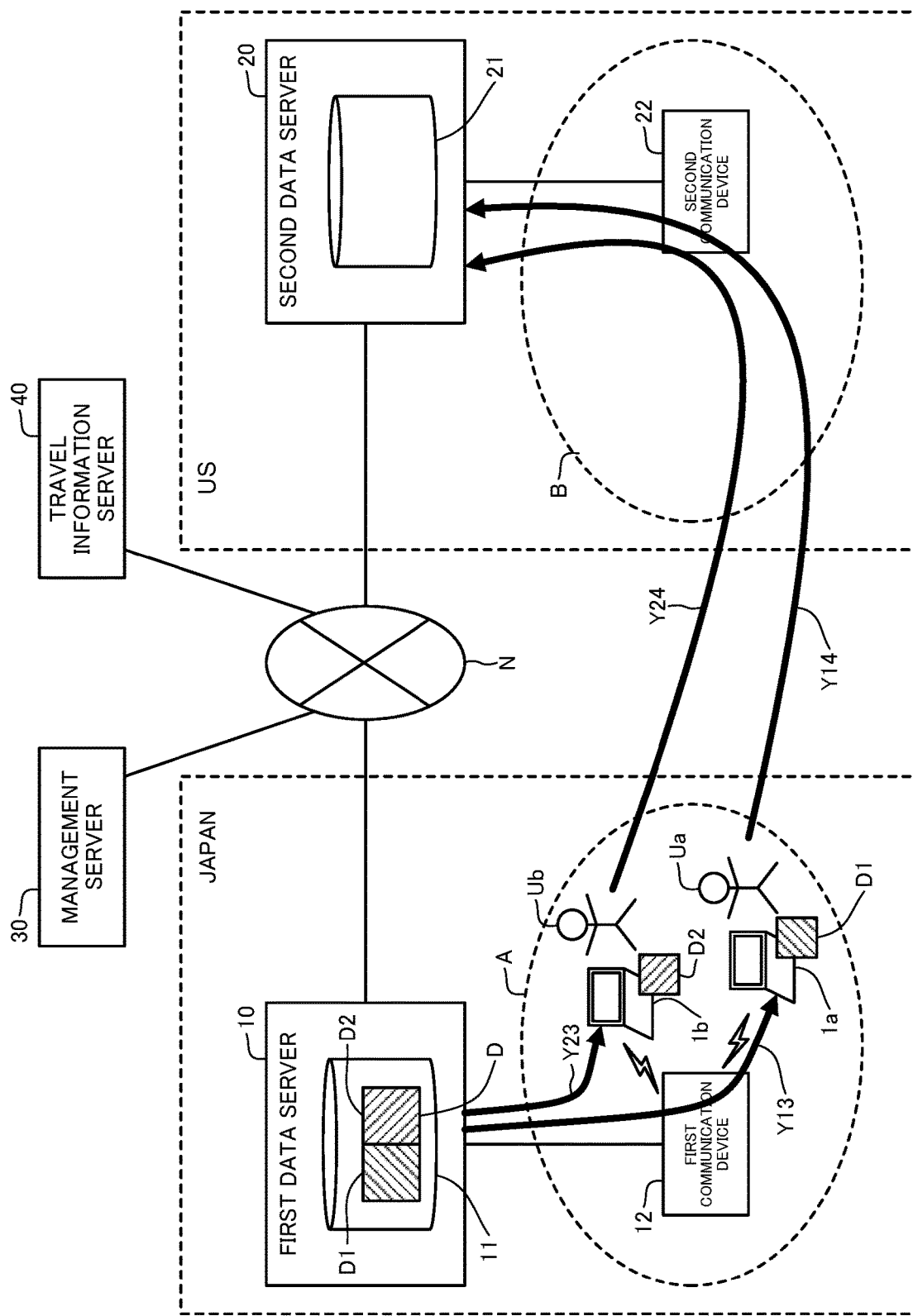
FIG. 10 illustrates a state of data transmission in the information processing system disclosed in FIG. 1.

Then, the management server 30 controls to divide the data D to be backed up (data D1, data D2), and store the divided data D1 and D2 in a distributed manner in respective information processing terminals 1a and 1b of the selected two users Ua and Ub in Japan (arrows Y13 and Y23 of FIG. 10). This means that the management server 30 detects the information processing terminals 1a and 1b of the two users Ua and Ub who come to the airport A in Japan, and stores the data D1 and the data D2 in the respective information processing terminals 1a and 1b via the first communication device 12. The process of storing the data D1 and the data D2 in the respective information processing terminals 1a and 1b is as described above.

Then, the users Ua and Ub take the flight while carrying the information processing terminals 1a and 1b in which the data D1 and the data D2 are stored respectively, whereby the users move to the airport B in the United States that is the place of arrival (arrows Y14 and Y24 of FIG. 10). This means that the data D1 and the data D2 stored in the information processing terminal 1 is transported to the airport B in the United States in a distributed manner.

Next, the second data server 20 installed in the United States acquire the data D1 and the data D2 from the respective information processing terminals 1a and 1b of the users Ua and Ub via the second communication device 22 installed in the airport B in the United States where the users Ua and Ub are going to arrive (arrows Y14 and Y24 of FIG. 10). The second data server 20 combines the data D1 and the data D2 acquired from the storage devices in the information processing terminals 1a and 1b carried by the users Ua and Ub, to thereby be able to store the data D. The process of reading the data D from the respective information processing terminals 1a and 1b is as described above.

Through these processes, according to the information processing system of the present embodiment, the data D stored in the first data server 10 is able to be stored in the second data server 20 without using the network N. Accordingly, in the case where the data D is data to be backed up, it is possible to move the data to the destination without placing a load on the network or taking the network cost.

Further, in the present variation, as data transport is performed in a distributed manner by the two users Ua and Ub, even if data carried by one of them is leaked, the data is not the complete data. Therefore, the security is enhanced. While the case of selecting the two users Ua and Ub has been described above as an example, the security of data transport is enhanced if a larger number of users are selected. Further, the divided data D1 and D2 may be transported in duplicate by a larger number of users, as in variation 1 described above.

Even in the aforementioned case, it is not limited that the information processing terminals 1a and 1b are transported by an airplane. They may be transported by another mobile body. Further, it is not limited that the information processing terminals 1a and 1b are transported by being carried by the users Ua and Ub. They may be loaded on a mobile body.

[Variation 3]

Next, another method of transporting the data D to be backed up will be described with reference to FIG. 11. In the present variation, description will be given on the case where the data D is transported by being distributed to an information processing terminal of a user who moves by a mobile body, and to the network N.

When the management server 30 selects a method of transporting the data D by distributing it to an information processing terminal and a network according to the significance or the previous setting of the selected data D, the management server 30 first selects one user U. This means that the management server 30 selects the user U whose place of departure and place of arrival match the backup source and the backup destination of the selected data D. Here, the case where one user U is selected is described as an example.

Figure 11:
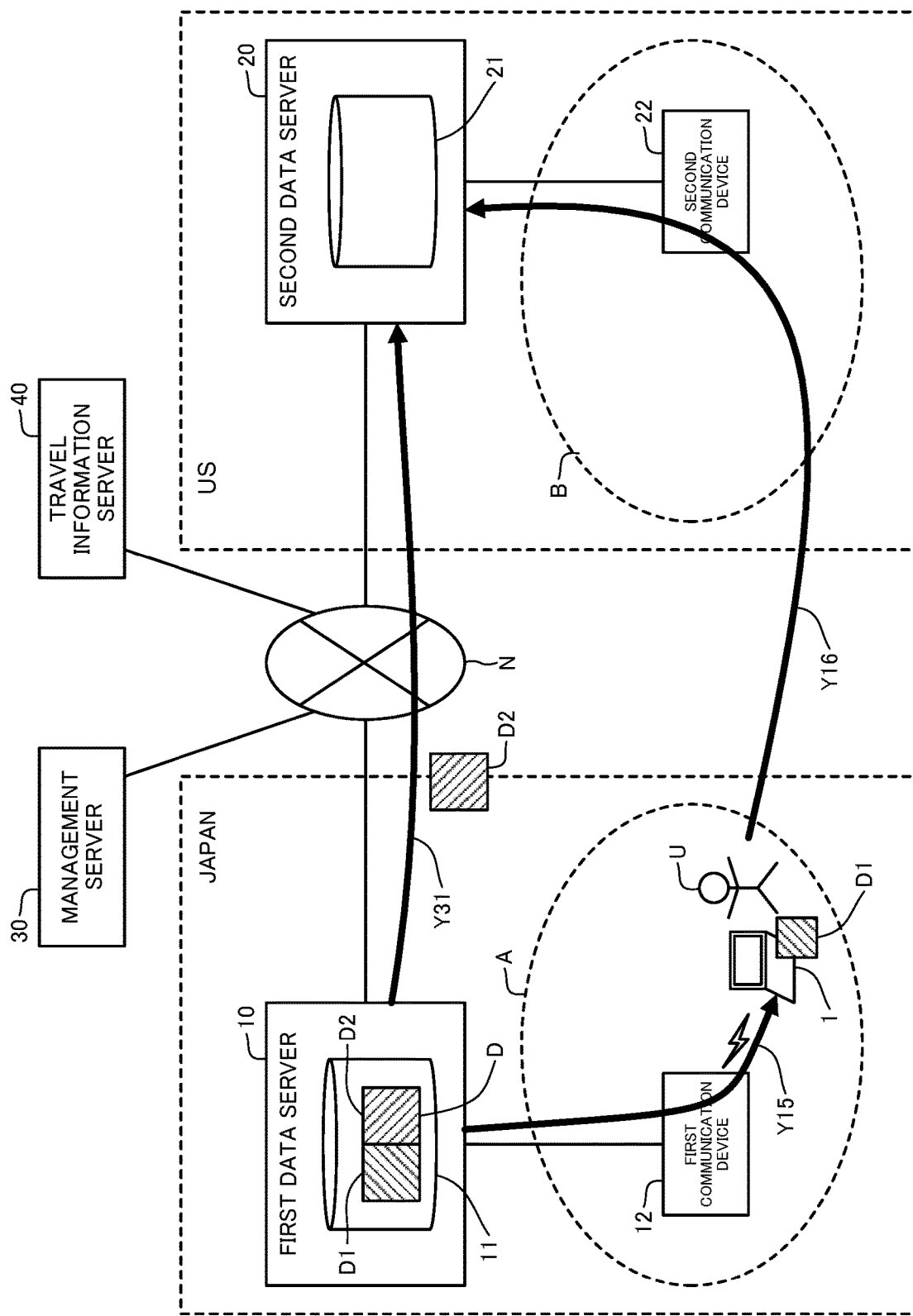
FIG. 11 illustrates a state of data transmission in the information processing system disclosed in FIG. 1.

Then, the management server 30 controls to divide the data D to be backed up (data D1, data D2), and store one of the divided data D1 and D2 in the information processing terminal 1 of the selected user U in Japan (arrow Y15 of FIG. 11). This means that the management server 30 detects the information processing terminal 1 of the user U who comes to the airport A in Japan, and stores the data D1 in the information processing terminal 1 via the first communication device 12. The process of storing the data D1 in the information processing terminal 1 is as described above.

Then, the user U takes the flight while carrying the information processing terminal 1 in which the data D1 is stored, whereby the user U moves to the airport B in the United States that is the place of arrival (an arrow Y16 of FIG. 11). This means that the data D1 stored in the information processing terminal 1 is transported to the airport B in the United States.

Next, the second data server 20 installed in the United States acquires the data D1 from the information processing terminal 1 of the user U via the second communication device 22 installed in the airport B in the United States where the user U is going to arrive (an arrow Y16 of FIG. 11). Thereby, the second data server 20 acquires only the data D1 that is part of the data D to be backed up. The process of reading the data D1 from the information processing terminal 1 is as described above.

Further, the management server 30 transmits the other data D2 obtained by dividing the data D to be backed up, to the second data server 20 via the network N (an arrow Y31 of FIG. 11). Thereby, the second data server 20 acquires the data D2 that is the other part of the data D to be backed up.

Then, the second data server 20 combines the data D1 transported by the user U who traveled by an airplane and the data D2 transmitted via the network N to thereby be able to store the data D.

Through these processes, according to the information processing system of the present embodiment, only part of the data D stored in the first data server 10 is able to be stored in the second data server 20 with use of the network N, and the residual is able to be stored without using the network N. Accordingly, it is possible to transfer the data to the destination while reducing the load on the network and the network cost.

Further, in the present variation, as data transport by the user U and data transmission by the network N are used, even if one data is leaked, the data is not the complete data. Therefore, the security is enhanced. While the case of selecting one user U has been described as an example, the security of data transport is enhanced if a plurality of users are selected to realize duplicate transport or distributed transport.

[Variation 4]

Next, another method of transporting the data D to be backed up will be described with reference to FIG. 12. In the present variation, description will be given on the case where the data D is transported by being relayed by information processing terminals of a plurality of users.

The management server 30 selects a plurality of users Uc and Ud if there is no user whose place of departure and place of arrival match the backup source and the backup destination of the selected data D. At this time, the management server 30 first selects the user Uc whose place of departure matches the backup source of the data D. In addition, the management server 30 selects the user Ud whose place of arrival matches the backup destination of the data. Here, the place of departure of the user Ud must match the place of arrival of the user Uc. Thereby, the data D can be relayed by the users Uc and Ud as described below.

Figure 12:
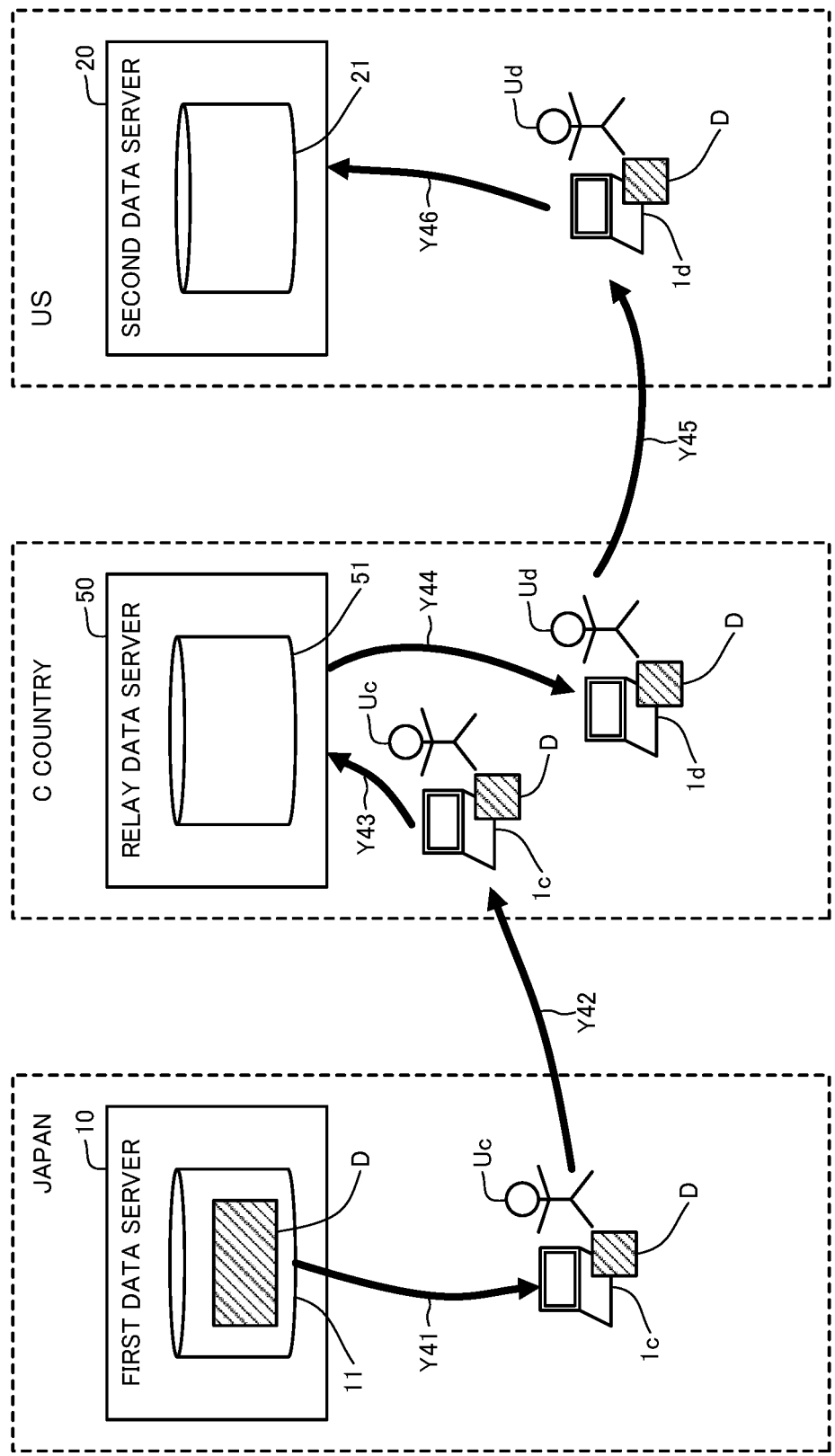
FIG. 12 illustrates a state of data transmission in the information processing system disclosed in FIG. 1.

Then, the management server 30 controls to store the data D to be backed up in an information processing terminal 1c of the selected user Uc in Japan (an arrow Y41 of FIG. 12). This means that the management server 30 detects the information processing terminal 1c of the user Uc who comes to the airport A in Japan, and stores the data D in the information processing terminal 1c via the first communication device 12. The process of storing the data D in the information processing terminal 1c is as described above.

Then, the user Uc takes the flight while carrying the information processing terminal 1c in which the data D1 is stored, whereby the user Uc moves to an airport in a country C that is the place of arrival (an arrow Y42 of FIG. 12). This means that the data D stored in the information processing terminal 1c is transported to the airport in the country C. In the country C, a relay data server 50 that received an instruction from the management server 30 is installed. The relay data server 50 temporarily reads the data D from the information processing terminal 1c of the user Uc and stores it, according to the instruction from the management server 30. The process of reading the data D from the information processing terminal 1c is as described above.

Next, the management server 30 controls to store the data D, temporarily stored in the relay data server 50 in the country C, in an information processing terminal 1d of the selected user Ud (an arrow Y44 of FIG. 12). This means that the management server 30 detects the information processing terminal 1d of the user Ud who comes to the airport in the country C, and stores the data D in the information processing terminal 1d. The process of storing the data D in the information processing terminal 1d is as described above.

Then, the user Ud takes the flight while carrying the information processing terminal 1d in which the data D is stored, whereby the user Ud moves to the airport in the United States that is the place of arrival (an arrow Y45 of FIG. 12). This means that the data D stored in the information processing terminal 1d is transported to the airport in the United States.

Then, the second data server 20 installed in the United States acquires the data D from the information processing terminal 1d of the user Ud via the second communication device 22 installed in the airport B in the United States where the user Ud is going to arrive (an arrow Y46 of FIG. 12). Thereby, the second data server 20 is able to store the data D acquired from the storage device in the information processing terminal 1d carried by the user Ud. The process of reading the data D from the information processing terminal 1d is as described above.

In the above description, the data control unit 33 of the management server 30 instructs the first data server 10 installed in Japan and the second data server 20 installed in the United States to control input and output of the data D to and from the information processing terminal 1. However, such an instruction may be made to another device. For example, the data control unit 33 may instruct the selected information processing terminal 1 to input and output the data D, or instruct the first communication device 12 or the second communication device 22 located at a place of departure or a place of arrival of the information processing terminal 1 to input and output the data D to and from the information processing terminal 1.

As an example, description will be given on the case where the data control unit 33 instructs the information processing terminal 1 of the user U selected by the user selection unit 32 to input and output the data D. It should be noted that the instruction by the data control unit 33, described below, is performed when the information processing terminal 1 of the selected user U accesses the management server 30 via the network N for the first time, for example.

First, the data control unit 33 instructs the information processing terminal 1 to communicate with the first communication device 12 installed in the airport A in Japan that is a place of departure, and download and store the data D stored in the first data server 10. For example, the data control unit 33 notifies the information processing terminal 1 of information for connection with the first communication device 12 and the first data server 10 in the airport A, and information for specifying the data D. Thereby, when the information processing terminal 1 is located at the airport A in Japan, the information processing terminal 1 accesses the first data server 10 via the first communication device 12 by wireless communication, and downloads the data D to be backed up from the first data server 10 and stores it in the storage device of the information processing terminal 1.

Further, the data control unit 33 instructs the information processing terminal 1 to communicate with the second communication device 22 installed in the airport B in the United States that is a place of arrival of the selected user U, and upload the stored data D to the second data server 20 and store it in the second data server 20. For example, the data control unit 33 notifies the information processing terminal 1 of information for connection with the second communication device 22 and the second data server 20, and information for identifying the data D. Thereby, when the information processing terminal 1 is located at the airport B in the United States, the information processing terminal 1 accesses the second data server 20 via the second communication device 22 by wireless communication, and uploads the data D stored in the storage device of the information processing terminal 1 to the second data server 20 and stores it in the second data server 20.

It should be noted that the data control unit 33 may perform the instruction described above by notifying the first communication device 12 installed in the airport A in Japan and the second communication device installed in the airport B in the United States, of identification information of the first data server 10, the second data server 20, and the information processing terminal 1 of the selected user U, information specifying the data D, and the like. In that case, the first communication device 12 detects the information processing terminal 1 of the user U who appears the airport A and makes a connection by wireless communication in the airport A, for example. Then, the first communication device 12 acquires the data D stored in the first data server 10 and stores it in the information processing terminal 1. Meanwhile, the second communication device 22 detects the information processing terminal 1 of the user U who appears the airport B and makes a connection by wireless communication in the airport B, for example. Then, the second communication device 22 acquires the data D stored in the information processing terminal 1 and stores it in the second data server 20.

Through these processes, according to the information processing system of the present embodiment, the data D stored in the first data server 10 is able to be stored in the second data server 20 without using the network N. Accordingly, in the case where the data D is data to be backed up, it is possible to move the data to the destination without placing a load on the network or taking the network cost. Further, in the present variation, as data transport is performed in a relayed manner by the two users Uc and Ud, data can be transported to any place.

While the case of relaying the data D by temporarily storing the data D in the relay data server 50 has been described above as an example, it is also possible to relay the data by the users Uc and Ud through direct communication with each other. Further, while the case of relaying the data by the two users Uc and Ud has been described above as an example, the data may be relayed by selecting a larger number of users. Further, the data may be transported in a relayed manner by a plurality of users while duplicating or distributing the data, as described in other variations described above.

Figure 13:
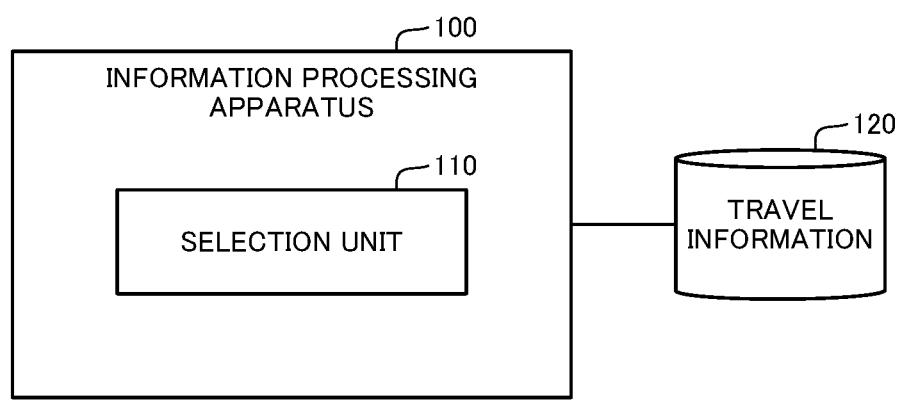
FIG. 13 is a block diagram illustrating a configuration of an information processing apparatus according to a second exemplary embodiment of the present invention.

Even in the aforementioned case, it is not limited that the information processing terminals 1c and 1d are transported by airplanes. They may be transported by other mobile bodies. Further, it is not limited that the information processing terminals 1c and 1d are transported by being carried by the users Uc and Ud. They may be loaded on mobile bodies Second Exemplary Embodiment Next, a second exemplary embodiment of the present invention will be described with reference to FIG. 13. FIG. 13 is a block diagram illustrating a configuration of a person detection system in the second exemplary embodiment. The person detection system of the present embodiment illustrates an outline of a configuration of the information processing system described in the first exemplary embodiment.

Figure 8:
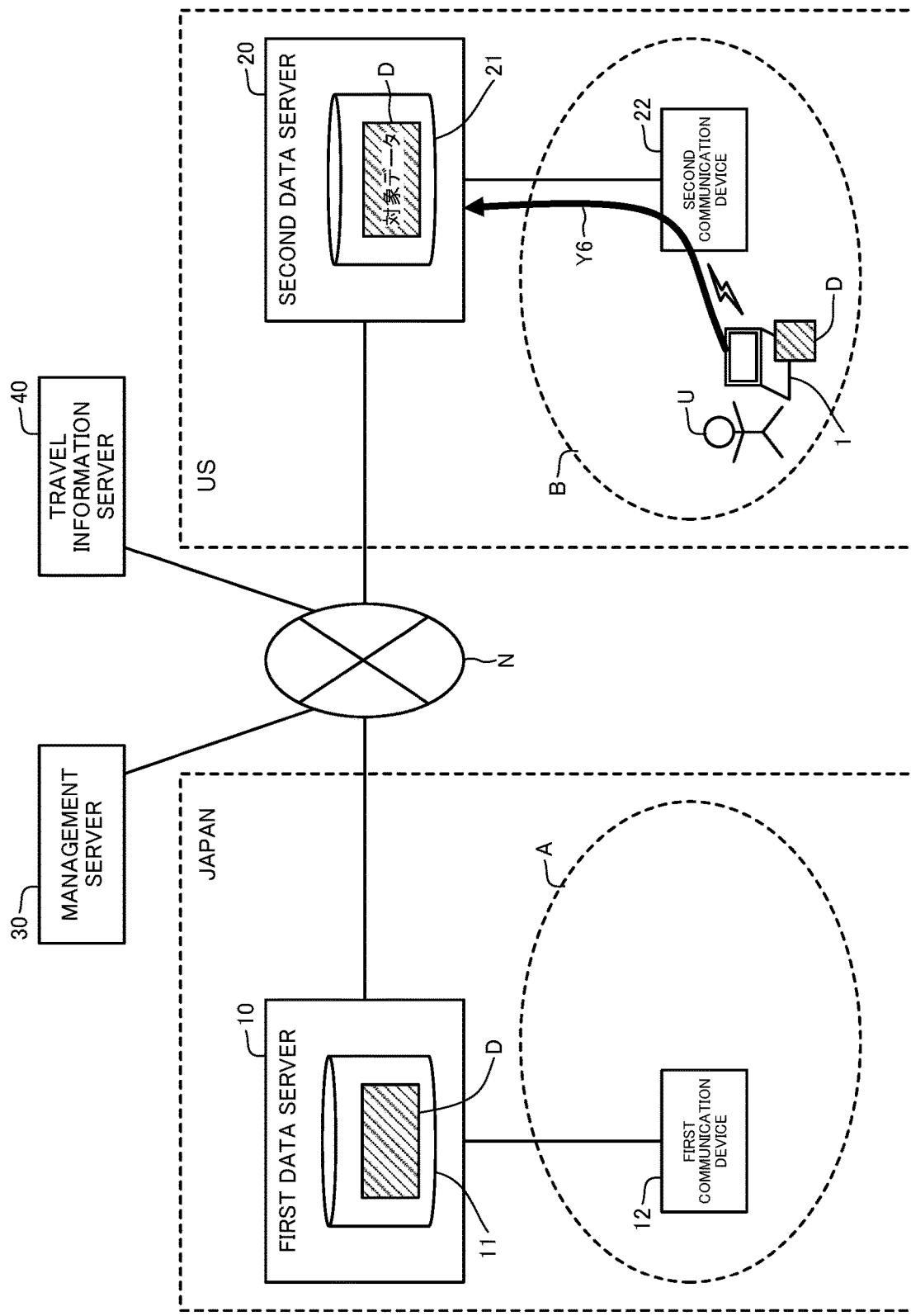
FIG. 8 illustrates a state of data transmission in the information processing system disclosed in FIG. 1.

As illustrated in FIG. 8, an information processing apparatus 100 of the present embodiment is configured to include a selection unit 110 configured to select a storage device to be moved from a first place associated with a first storage device to a second place associated with a second storage device connected with the first storage device over a network, based on travel information 120 including the origin and the destination of the storage device. The storage device is selected as a third storage device to be used for storing transport target data stored in the first storage device and transporting the data to the second storage device. The selection unit 110 may be constructed when an arithmetic unit in the information processing apparatus executes a program.

According to the information processing apparatus of the aforementioned configuration, by the third device selected based on the travel information and moved from the first place to the second place, it is possible to transport the transport target data stored in the first storage device located at the first place to the second storage device located at the second place. This means that by the third storage device that is scheduled to be moved according to the travel information, it is possible to transport data to a destination without using a network. Accordingly, it is possible to transfer data to a destination without placing a load on a network and without any network cost.

<Supplementary Notes>

The whole or part of the exemplary embodiments disclosed above can be described as, but not limited to, the following supplementary notes. Hereinafter, outlines of the configurations of an information processing apparatus, an information processing system, a storage device, an information processing method, and a program according to the present invention will be described. However, the present invention is not limited to the configurations described below.

(Supplementary Note 1)

An information processing apparatus comprising:
a selection unit configured to select a storage device to be moved from a first place associated with a first storage device to a second place associated with a second storage device connected with the first storage device over a network, based on travel information including an origin and a destination of the storage device, the storage device being selected as a third storage device to be used for storing transport target data stored in the first storage device and transporting the data to the second storage device.

(Supplementary Note 2)

The information processing apparatus according to supplementary note 1, further comprising
a control unit configured to control input and output of the transport target data to and from the third storage device so as to store the transport target data in the third storage device located at the first place from the first storage device, and acquire the transport target data from the third storage device located at the second place and store the transport target data in the second storage device.

(Supplementary Note 3)

The information processing apparatus according to supplementary note 2, wherein
the selection units selects a plurality of the third storage devices, and
the control unit controls input and output of the transport target data to and from the third storage devices such that at least part of the transport target data stored in the first storage device is stored in the third storage devices and transported to the second storage device by the third storage devices.

(Supplementary Note 4)

The information processing apparatus according to supplementary note 3, wherein
the control unit controls input and output of the transport target data to and from the third storage devices such that the transport target data stored in the first storage device is stored in a distributed manner in the third storage devices and transported to the second storage device.

(Supplementary Note 5)

The information processing apparatus according to supplementary note 3 or 4, wherein
the control unit controls input and output of the transport target data to and from the third storage devices such that at least part of the transport target data stored in the first storage device is stored in in duplicate in the third storage devices and transported to the second storage device.

(Supplementary Note 6)

The information processing apparatus according to any of supplementary notes 3 to 5, wherein
the control unit controls input and output of the transport target data to and from the third storage devices such that the transport target data stored in the first storage device is transported to the second storage device by being relayed by the third storage devices.

(Supplementary Note 7)

The information processing apparatus according to any of supplementary notes 2 to 6, wherein
the control unit controls input and output of the transport target data to and from the third storage device such that one part of the transport target data stored in the first storage device is stored in the third storage device and transported to the second storage device, and another part of the transport target data is transmitted from the first storage device to the second storage device over the network.

(Supplementary Note 8)

The information processing apparatus according to any of supplementary notes 1 to 7, wherein
the selection unit selects the third storage device based on data transmission information including a transmission source and a transmission destination of the transport target data, and the travel information.

(Supplementary Note 9)

The information processing apparatus according to supplementary note 8, wherein the selection unit selects the third storage device in which the first place corresponding to the transmission source of the transport target data and the second place corresponding to the transmission destination of the transport target data are set as an origin and a destination, respectively, based on the data transmission information and the travel information.

(Supplementary Note 10)

The information processing apparatus according to any of supplementary notes 1 to 9, further comprising a travel information acquisition unit configured to acquire reservation information of a transportation that a person who carries the storage device takes, wherein the selection unit selects the third storage device based on the reservation information.

(Supplementary Note 11)

An information processing system comprising:

an information processing apparatus including a selection unit configured to select a storage device to be moved from a first place associated with a first storage device to a second place associated with a second storage device connected with the first storage device over a network, based on travel information including an origin and a destination of the storage device, the storage device being selected as a third storage device to be used for storing transport target data stored in the first storage device and transporting the data to the second storage device;

a first processing device connected with the first storage device over a network and installed in the first place, the first processing device being configured to connect with the third storage device at the first place and store the transport target data in the third storage device from the first storage device; and a second processing device connected with the second storage device over a network and installed in the second place, the second processing device being configured to connect with the third storage device at the second place, acquire the transport target data from the third storage device, and store the transport target data in the second storage device.

(Supplementary Note 12)

The information processing system according to supplementary note 11, wherein the information processing apparatus includes a control unit configured to control input and output of the transport target data to and from the third storage device so as to store the transport target data in the third storage device located at the first place from the first storage device, and acquire the transport target data from the third storage device located at the second place and store the transport target data in the second storage device, via the first processing device and the second processing device.

(Supplementary Note 13)

A storage device to be selected based on travel information including an origin and a destination of the storage device, and moved from a first place associated with a first storage device to a second place associated with a second storage device connected with the first storage device over a network, the storage device being configured to store transport target data stored in the first storage device at the first place, and store the stored transport target data in the second storage device at the second place.

(Supplementary Note 14)

The storage device according to supplementary note 13, wherein the storage device is connected with the first storage device over a network and connects with the first processing device installed in the first place at the first place, and stores the transport target data from the first storage device via the first processing device, and the storage device is connected with the second storage device over a network and connects with the second processing device installed in the second place at the second place, and the transport target data is read by the second processing device and stored in the second storage device.

(Supplementary Note 15)

An information processing method comprising selecting a storage device to be moved from a first place associated with a first storage device to a second place associated with a second storage device connected with the first storage device over a network, based on travel information including an origin and a destination of the storage device, the storage device being selected as a third storage device to be used for storing transport target data stored in the first storage device and transporting the transport target data to the second storage device.

(Supplementary Note 16)

The information processing method according to supplementary note 15, further comprising controlling input and output of the transport target data to and from the third storage device so as to store the transport target data in the third storage device located at the first place from the first storage device, and acquire the transport target data from the third storage device located at the second place and store the transport target data in the second storage device.

(Supplementary Note 17)

The information processing method according to supplementary note 16, further comprising selecting a plurality of the third storage devices, and controlling input and output of the transport target data to and from the third storage devices such that at least part of the transport target data stored in the first storage device is stored in the third storage devices and transported to the second storage device by the third storage devices.

(Supplementary Note 18)

The information processing method according to supplementary note 17, further comprising controlling input and output of the transport target data to and from the third storage devices such that the transport target data stored in the first storage device is stored in a distributed manner in the third storage devices and transported to the second storage device.

(Supplementary Note 19)

The information processing method according to any of supplementary notes 17 to 19, further comprising controlling input and output of the transport target data to and from the third storage devices such that at least part of the transport target data stored in the first storage device is stored in duplicate in the third storage devices and transported to the second storage device.

(Supplementary Note 20)

The information processing method according to any of supplementary notes 17 to 19, further comprising controlling input and output of the transport target data to and from the third storage devices such that the transport target data stored in the first storage device is transported to the second storage device by being relayed by the third storage devices.

(Supplementary Note 21)

The information processing method according to any of supplementary notes 18 to 20, further comprising controlling input and output of the transport target data to and from the third storage device such that one part of the transport target data stored in the first storage device is stored in the third storage device and transported to the second storage device, and another part of the transport target data is transmitted from the first storage device to the second storage device over the network.

(Supplementary Note 22)

The information processing method according to any of supplementary notes 16 to 21, further comprising selecting the third storage device based on data transmission information including a transmission source and a transmission destination of the transport target data, and the travel information.

(Supplementary Note 23)

The information processing method according to supplementary note 22, further comprising selecting the third storage device in which the first place corresponding to the transmission source of the transport target data and the second place corresponding to the transmission destination of the transport target data are set as an origin and a destination, respectively, based on the data transmission information and the travel information.

(Supplementary Note 24)

The information processing method according to any of supplementary notes 16 to 23, further comprising acquiring reservation information of a transportation that a person who carries the storage device takes, and selecting the third storage device based on the reservation information.

(Supplementary Note 25)

A non-transitory computer-readable medium storing a program comprising instructions to cause an information processing apparatus to realize a selection unit configured to select a storage device to be moved from a first place associated with a first storage device to a second place associated with a second storage device connected with the first storage device over a network, based on travel information including an origin and a destination of the storage device, the storage device being selected as a third storage device to be used for storing transport target data stored in the first storage device and transporting the data to the second storage device.

(Supplementary Note 26)

The non-transitory computer-readable medium storing the program according to supplementary note 25, further comprising instructions to cause the information processing apparatus to realize a control unit configured to control input and output of the transport target data to and from the third storage device so as to store the transport target data in the third storage device located at the first place from the first storage device, and acquire the transport target data from the third storage device located at the second place and store the transport target data in the second storage device.

It should be noted that the program described above may be stored in a storage device or stored on a computer-readable storage medium. The storage medium is a portable medium such as a flexible disk, an optical disk, a magneto-optical disk, or a semiconductor memory, for example.

While the present invention has been described with reference to the exemplary embodiments described above, the present invention is not limited to the above-described embodiments. The form and details of the present invention can be changed within the scope of the present invention in various manners that can be understood by those skilled in the art.

REFERENCE SIGNS LIST 1, 1a, 1b, 1c, 1d information processing terminal
10 first data server
11 first storage device
12 first communication device
20 second data server
21 second storage device
22 second communication device
30 management server
31 travel information acquisition unit
32 user selection unit
33 data control unit
35 user information storage unit
36 data management information storage unit
40 travel information server
100 information processing apparatus
110 selection unit
120 travel information
D, D1, D2 data
N network
U, Ua, Ub, Uc, Ud user

The invention claimed is:

1. An information processing apparatus comprising:
a memory containing a processing instruction; and
at least one processor configured to execute the processing instruction, wherein
the memory stores travel information including an origin and a destination of a user who carries an information processing terminal including a storage device or a moving body on which the information processing terminal is loaded, and
the at least one processor is configured to execute processing to:
select a storage device, included in the information processing terminal carried by the user or in the information processing terminal loaded on the moving body, to be moved from a first place associated with a first storage device to a second place associated with a second storage device connected with the first storage device over a network, based on the travel information, the storage device being selected as a third storage device to be used for storing transport target data stored in the first storage device and transporting the data to the second storage device;
control input and output of the transport target data to and from the third storage device so as to store the transport target data in the third storage device located at the first place from the first storage device, and acquire the transport target data from the third storage device located at the second place and store the transport target data in the second storage device,
further select a plurality of the storage devices, included in the information processing terminal carried by the user or in the information processing terminal loaded on the moving body, in which the destination of the user or the moving body matches an origin of another one of the users or the moving bodies, as the third storage devices, based on the travel information, and
control input and output of the transport target data to and from the third storage devices such that the transport target data stored in the first storage device is transported to the second storage device by being relayed by the third storage devices.

2. The information processing apparatus according to claim 1, wherein
at least one processor controls input and output of the transport target data to and from the third storage devices such that the transport target data stored in the first storage device is stored in a distributed manner in the third storage devices and transported to the second storage device.

3. The information processing apparatus according to claim 1, wherein
the at least one processor controls input and output of the transport target data to and from the third storage devices such that at least part of the transport target data stored in the first storage device is stored in duplicate in the third storage devices and transported to the second storage device.

4. The information processing apparatus according to claim 1, wherein
the at least one processor controls input and output of the transport target data to and from the third storage device such that one part of the transport target data stored in the first storage device is stored in the third storage device and transported to the second storage device, and another part of the transport target data is transmitted from the first storage device to the second storage device over the network.

5. The information processing apparatus according to claim 1, wherein
the at least one processor selects the third storage device based on data transmission information including a transmission source and a transmission destination of the transport target data, and the travel information.

6. The information processing apparatus according to claim 5, wherein
the at least one processor selects the third storage device in which the first place corresponding to the transmission source of the transport target data and the second place corresponding to the transmission destination of the transport target data are set as an origin and a destination, respectively, based on the data transmission information and the travel information.

7. The information processing apparatus according to claim 1,
wherein the at least one processor is further configured to acquire reservation information of a transportation that a person who carries the storage device takes, and
the processor selects the third storage device based on the reservation information.

8. An information processing system comprising:
an information processing apparatus comprising:
a memory containing a processing instruction; and
at least one processor configured to execute the processing instruction, wherein
the memory stores travel information including an origin and a destination a user who carries an information processing terminal including a storage device or a moving body on which the information processing terminal is loaded, and
the at least one processor is configured to execute processing to:
select a storage device, included in the information processing terminal carried by the user or in the information processing terminal loaded on the moving body, to be moved from a first place associated with a first storage device to a second place associated with a second storage device connected with the first storage device over a network, based on the travel information, the storage device being selected as a third storage device to be used for storing transport target data stored in the first storage device and transporting the data to the second storage device;

a first processing device connected with the first storage device over a network and installed in the first place, the first processing device being configured to connect with the third storage device at the first place and store the transport target data in the third storage device from the first storage device; and
a second processing device connected with the second storage device over a network and installed in the second place, the second processing device being configured to connect with the third storage device at the second place, acquire the transport target data from the third storage device, and store the transport target data in the second storage device,
wherein the processor is further configured to execute processing to:
control input and output of the transport target data to and from the third storage device so as to store the transport target data in the third storage device located at the first place from the first storage device, and acquire the transport target data from the third storage device located at the second place and store the transport target data in the second storage device, wherein
select a plurality of the storage devices, included in the information processing terminal carried by the user or in the information processing terminal loaded on the moving body, in which the destination of the user or the moving body matches an origin of another one of the users or the moving bodies, as the third storage devices, based on the travel information, and
control input and output of the transport target data to and from the third storage devices such that the transport target data stored in the first storage device is transported to the second storage device by being relayed by the third storage devices.

9. An information processing method comprising
storing travel information including an origin and a destination of a user who carries an information processing terminal including a storage device or a moving body on which the information processing terminal is loaded;
selecting a storage device, included in the information processing terminal carried by the user or in the information processing terminal loaded on the moving body, to be moved from a first place associated with a first storage device to a second place associated with a second storage device connected with the first storage device over a network, based on the travel information, the storage device being selected as a third storage device to be used for storing transport target data stored in the first storage device and transporting the transport target data to the second storage device;
controlling input and output of the transport target data to and from the third storage device so as to store the transport target data in the third storage device located at the first place from the first storage device, and acquire the transport target data from the third storage device located at the second place and store the transport target data in the second storage device, wherein
wherein selecting the storage device comprises selecting a plurality of the storage devices, included in the information processing terminal carried by the user or in the information processing terminal loaded on the moving body, in which the destination of the user or the moving body matches an origin of another one of the users or the moving bodies, as the third storage devices, based on the travel information, and
controlling input and output comprises controlling input and output of the transport target data to and from the third storage devices such that the transport target data stored in the first storage device is transported to the second storage device by being relayed by the third storage devices.

10. The information processing method according to claim 9, further comprising controlling input and output of the transport target data to and from the third storage devices such that the transport target data stored in the first storage device is stored in a distributed manner in the third storage devices and transported to the second storage device.

11. The information processing method according to claim 9, further comprising controlling input and output of the transport target data to and from the third storage devices such that at least part of the transport target data stored in the first storage device is stored in duplicate in the third storage devices and transported to the second storage device.

12. The information processing method according to claim 10, further comprising controlling input and output of the transport target data to and from the third storage device such that one part of the transport target data stored in the first storage device is stored in the third storage device and transported to the second storage device, and another part of the transport target data is transmitted from the first storage device to the second storage device over the network.

13. The information processing method according to claim 9, further comprising selecting the third storage device based on data transmission information including a transmission source and a transmission destination of the transport target data, and the travel information.

* * * * *